Dec. 4, 1923. 1,476,536
T. S. MILLER
BUCKET AND ASSOCIATED PARTS FOR CABLEWAYS
Filed Dec. 12, 1922 3 Sheets-Sheet 1
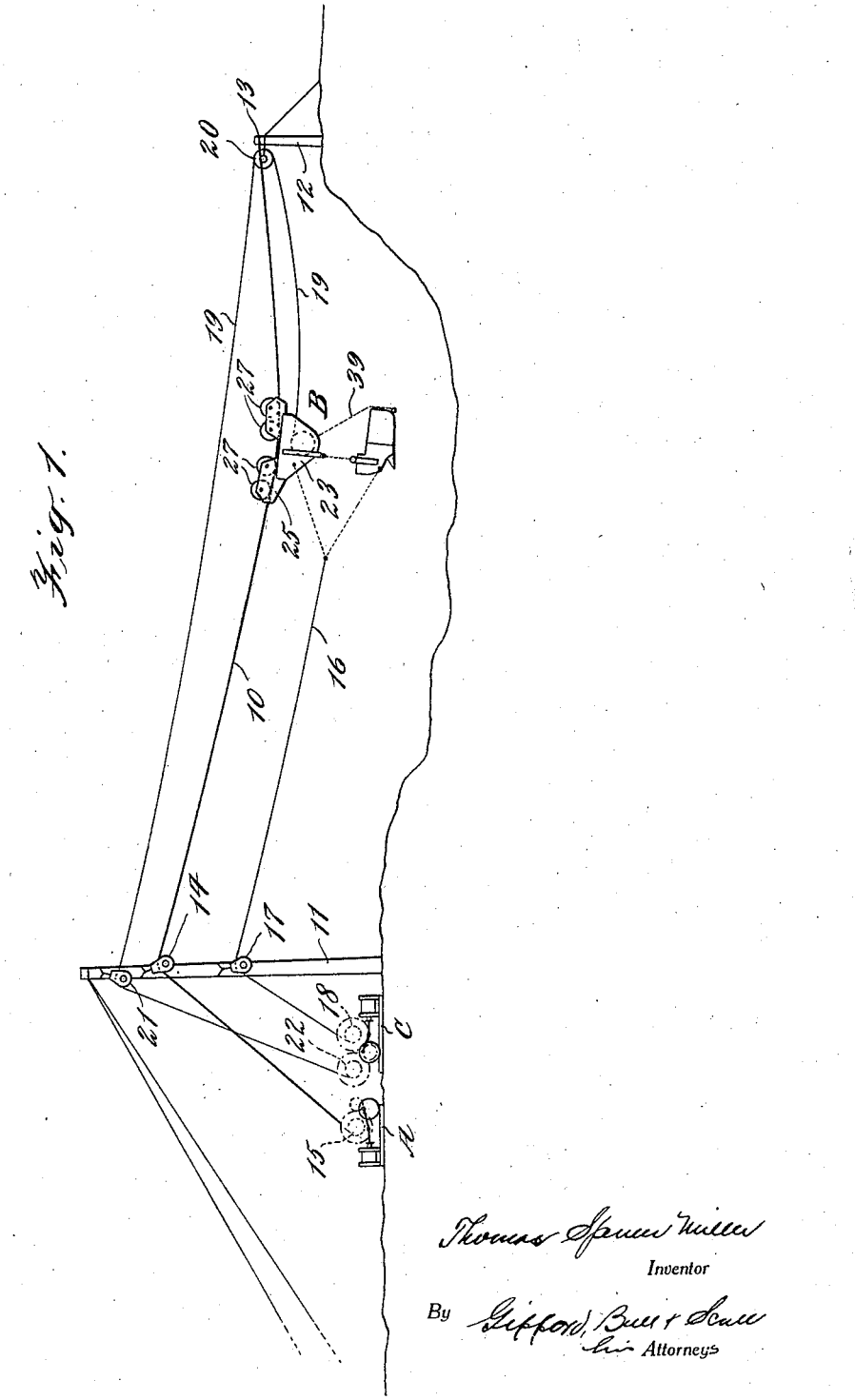

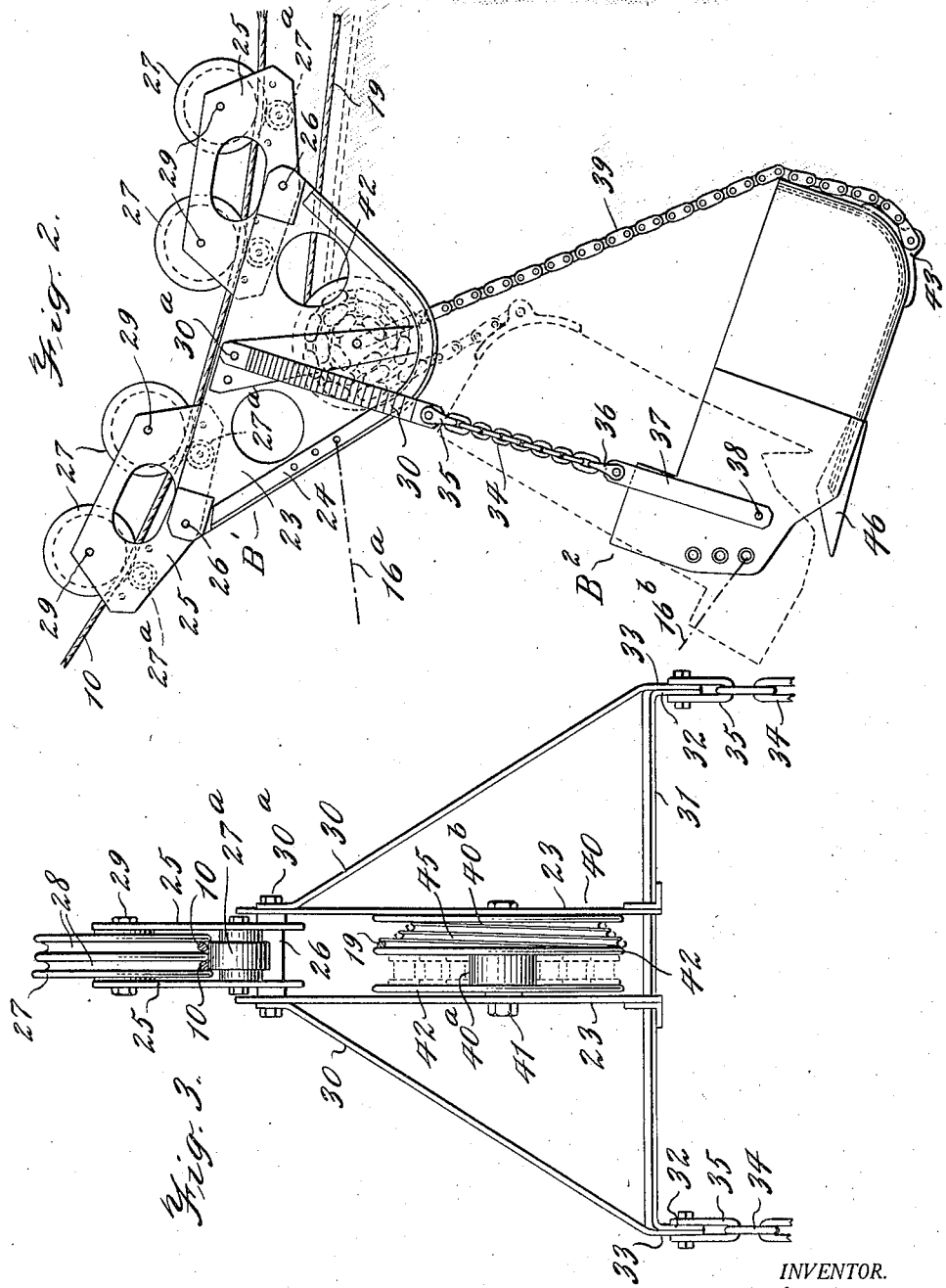

Dec. 4, 1923.
T. S. MILLER
1,476,536
BUCKET AND ASSOCIATED PARTS FOR CABLEWAYS
Filed Dec. 12, 1922  3 Sheets-Sheet 3
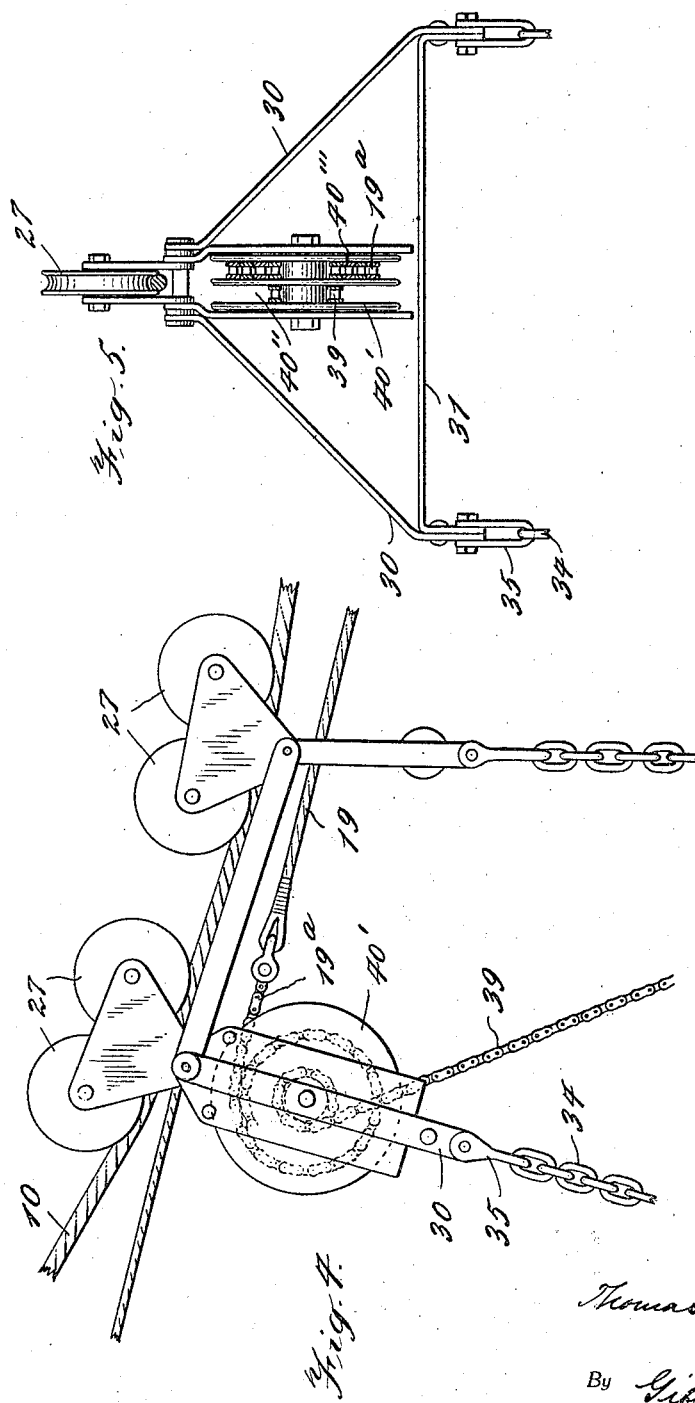

Patented Dec. 4, 1923.

1,476,536

UNITED STATES PATENT OFFICE.

THOMAS SPENCER MILLER, OF SOUTH ORANGE, NEW JERSEY.

BUCKET AND ASSOCIATED PARTS FOR CABLEWAYS.

Application filed December 12, 1922. Serial No. 606,487.

*To all whom it may concern:*

Be it known that I, THOMAS SPENCER MILLER, a citizen of the United States, and a resident of South Orange, in the county of Essex and State of New Jersey, have invented certain new and useful Improvements in Buckets and Associated Parts for Cableways, of which the following is a specification.

My present application is a continuation in part of my application Serial No. 459,071, which was filed in the Patent Office on or about April 6, 1921, and relates particularly to the bucket and the associated parts.

My invention will best be understood by reference to the accompanying drawings, in which I have illustrated one embodiment of my invention, and in which Fig. 1 is a diagrammatic view illustrating a cableway with which my invention may be carried out; Fig. 2 is a side view of the load-carrier; Fig. 3 is an end view thereof, showing the cables in section; Fig. 4 is a side view illustrating a modified form of my invention, and Fig. 5 is an end view of Fig. 4.

Like reference characters indicate like parts throughout the drawings.

Referring, now, to the drawings, 10 is a load-supporting cable or cables suspended between a main tower or support 11 and a tail tower or support 12, the load-carrier, which I have indicated, in general, at B, being adapted to traverse the main cable. In accordance with my invention, means are provided for varying the elevation of this cable between the supports from which it is suspended so that by raising and lowering the cable the elevation of the load carrier may be adjusted to cause the same to approach or rest on the ground or other surface, and by elevation of the main cable, be lifted for transportation clear of the ground or other obstructions. Various means may be employed for varying the elevation of the main supporting cable, but a preferable means consists in attaching one end of the main cable to the tail tower or support, as at 13, and passing the other end of the cable over a sheave 14 attached to the main tower and winding the end of the cable onto a drum 15 operated by the main cable take-up engine, which I have indicated, in general, at A. The load-carrier may be and preferably is moved in one direction by an inhaul cable 16, one end of which is attached, by the branches 16ª and 16ᵇ, to the load-carrier, as indicated in Figs. 1 and 2, the opposite end passing over a sheave 17 secured to the main tower 11 and wound upon a drum 18 of a digging engine, which I have indicated, in general, at C. The load-carrier is moved in the opposite direction by an outhaul cable 19, one end of which is attached to the load-carrier, as indicated, in a general way, in Fig. 1, the outhaul cable passing over a sheave 20 attached to the tail tower 12 and a sheave 21 secured to the head tower 11, the end of the cable being wound upon a drum 22 of the engine C.

I have illustrated, in Figs. 2 and 3, the preferred form of load-carrier, comprising, in the form here shown, a carriage B' provided with a frame, preferably including two vertical spaced plates 23 provided at their edges with ribbed strengthening flanges 24. The frame is preferably formed substantially triangular in shape, as indicated, and at the upper angles of the frame are preferably provided auxiliary supporting frames comprising spaced plates 25 pivoted to the main plates 23, as at 26, and carrying the running wheels 27, which are preferably arranged in tandem, as shown. When two main supporting cables 10 are provided, as illustrated in the drawings, then the running wheels 27 are provided with two grooves 28 engaging the respective cables 10, the running wheels being journalled on pins mounted in the plates 25, as at 29. Suitable retaining rollers 27ª are also preferably provided immediately beneath the wheels 27 and having their bearings in the plates 25, as shown, for the purpose of retaining the running wheels in engagement with the main cables. Supporting means for supporting the load-carrier proper, or bucket B², from the carriage preferably comprises bars 30 secured at their upper ends, as at 30ª, to the plates 23 and outwardly and downwardly inclined, as indicated in Fig. 3, the lower ends of the bars 30 being spaced apart by a strut 31, the ends of which are turned downwardly, as at 32, so as to engage the downwardly-turned ends 33 of the bars 30, as best shown in Fig. 3, the ends 32 and 33 being secured together in any desired manner. To the lower ends of the flanges 32 and 33 are connected chains 34 for supporting the front end of the bucket, the chains preferably being shackled to the lower ends of the bars, as at 35. The lower ends of the chains are, in turn, connected, as by shackles 36, to the upper ends of supporting bars or arms 37, which are pivoted, as at 38, to the front end of the bucket (only one of the bars 37 being shown in Fig. 2). The rear end of the bucket B² is preferably supported by means of a chain 39, or other flexible member, the upper end of which is attached to a differential drum 40 having its bearings at 41 in the spaced plates 23, the drum having two winding portions, one portion 40ª for said chain leading to the bucket and the other 40ᵇ for the outhaul cable.

The portion 40ª is provided with flanges 42, preferably spaced apart just sufficiently to accommodate the chain 39, so that when the chain is wound upon its portion of the drum, it will assume a spiral form (for a purpose which will presently be explained), as indicated in dotted lines in Fig. 2. The lower end of the chain is attached to the rear end of the bucket, preferably by means of a bracket 43, which is preferably secured to the bucket at the lowermost rear portion. In accordance with my invention, the outhaul cable 19 is wound upon the portion 40ᵇ of the drum 40, which portion is preferably provided with a spiral groove 45 of varying diameter, as indicated in Fig. 3, on which the end of the outhaul cable is wound, the outhaul cable preferably engaging substantially the entire groove, so that it leaves the pulley at that portion of the groove of greatest diameter when the bucket is in its lowered position, as indicated in full lines in Fig. 2. At this time, the supporting chain 39 engages the periphery of the drum on which it is wound, which is of a lesser diameter than the portion 40ᵇ, so that the chain leaves the drum at a point the minimum distance from the axis thereof. The bucket may be dumped in any desired manner, as by holding fast the inhaul cable and increasing the tension on the outhaul cable. At this time, since the outhaul cable leaves the pulley on which it is wound at a point the maximum distance from the center thereof, and since the supporting chain 39 for the rear end of the bucket engages its pulley at a point the minimum distance from the axis thereof, there will be a maximum leverage and a minimum of force will be required to be applied to the inhaul cable in order to raise the rear end of the bucket and thus dump the same. I have illustrated an open-ended bucket b², which is provided on its front end with digging teeth 46 of known construction. On the other hand, when the rear end of the bucket is to be lowered, the chain 39 leaves its drum portion 40ª at a point further from the axis than when the end of the bucket is being elevated, while the outhaul cable 19 leaves its drum portion 40ᵇ at a point nearer the axis, so that there is a maximum leverage for returning the bucket to normal position. With the described arrangement, the chain 39 is utilized for both supporting and dumping the bucket.

In Figs. 4 and 5, I have illustrated a modified form of my invention in which the differential drum indicated generally at 40' comprises a section 40", on which is wound the chain 39 leading to the bucket, and which is similar to the section 40ª of the differential drum illustrated in Fig. 3. The other section 40''' is of the same diameter and otherwise similar to the section 40". In this form of my invention, I prefer to include in the outhaul cable or traversing line, a chain 19ª attached to the main part of the cable, and which is wound upon the section 40''' of the drum the spacing between the flanges of the drum being approximately the same as the width of the chain 19ª. Under some conditions, the traversing line or outhaul cable may be uniform throughout and wound upon itself upon the drum section, although I prefer to include the chain section in the traversing line because of its greater flexibility and because generally it is better adapted to be wound upon itself. The two chains are so arranged on the two sections of the drum, that when the bucket is in its lowered position, the chain 39 is nearly unwound from its section of the drum, with the consequence that it acts on its sections with a small leverage, whereas the chain 19ª is wound on the section 40''' of the drum so as to leave the drum at a considerable distance from the center as indicated in Fig. 5 and thus acts on its drum with a longer leverage than does the chain 39. With the arrangement here illustrated, therefore, as well as with the arrangement illustrated in Figs. 2 and 3, when the bucket is in its lowered position and filled, the dumping stress is a maximum and the ratio of the diameters between the chains 19ª and 39, wound upon their respective drums is greatest, and when the bucket is empty and in its raised position, the condition is just reverse, for then the dumping chain has filled up its compartment in a coil of relatively large diameter and the outhaul cable chain forms a coil of relatively small diameter.

The motive power for raising and dumping the bucket is the pull on the outhaul cable. The motive power for rewinding the outhaul cable or the chain attached to the same is the weight of a part of the bucket. It is, therefore, of importance that the bucket when in its raised position should have the maximum leverage in its favor for the purpose of rewinding the outhaul and dumping line.

What I claim and desire to secure by Letters Patent of the United States is:

1. In combination, a main supporting cable, a load-carrier comprising a carriage adapted to traverse said cable, a bucket pivotally suspended at one end from said carriage, a traversing line, a compound drum mounted on said carriage having two sections, on one section of which said traversing line is wound, and a flexible member wound upon the other section of the drum and connected to the end of said bucket opposite to that from which it is pivotally suspended, the parts being constructed and arranged to increase the leverage at which said traversing line acts on its section of the drum as the bucket is lowered.

2. In combination, a main supporting cable, a load-carrier comprising a carriage adapted to traverse said cable, a bucket pivotally suspended at one end from said carriage, a traversing line, a compound drum mounted on said carriage having two sections, on one section of which said traversing line is wound, and a flexible member wound upon the other section of the drum and connected to the end of said bucket opposite to that from which it is pivotally suspended, the parts being constructed and arranged to increase the leverage of which said traversing line acts on its section of the drum as the bucket is lowered.

3. In combination, a main supporting cable, a load-carrier comprising a carriage adapted to traverse said cable, a bucket pivotally suspended at one end from said carriage, a traversing line, a compound drum mounted on said carriage having two sections, one section of which is provided with a helical groove of variable diameter on which said traversing line is wound, and a flexible connection wound on the other section of the drum and connected to the end of the bucket opposite to that from which it is suspended, the traversing line leaving said spiral groove at a larger diameter when the bucket is in its lowered position than when in the raised position.

4. In combination, a main supporting cable, a load carrier comprising a carriage adapted to traverse said cable, a bucket pivotally suspended at one end from said carriage, a traversing line, a compound drum mounted on said carriage having two sections, said traversing line being wound on one section of the drum and a flexible member wound upon the other section of the drum and connected to the end of the bucket opposite to that from which the same is pivotally suspended, the parts being constructed and arranged to increase the leverage at which said traversing line and decrease the leverage at which said flexible line act on their respective drums as the bucket is lowered.

5. In combination, a main supporting cable, a load-carrier comprising a carriage adapted to traverse said cable, a bucket pivotally suspended at one end from said carriage, a traversing line, a compound drum mounted on said carriage having two sections, one section of the drum being provided with a helical groove of variable diameter upon which said traversing line is wound, and a flexible member connected to the end of the bucket opposite to that from which it is suspended, said flexible member being wound upon the other section of the drum with the parts constructed and arranged to cause said flexible member to be wound on its section in a spiral.

6. In a cableway, in combination, spaced supports a main cable suspended thereby, a carriage supported by and adapted to move along the main cable, a differential drum mounted on said carriage and comprising a portion formed with a spiral groove of variable diameter, a traversing line for said carriage wound upon the portion of said drum formed with the spiral groove and leaving the same at the largest diameter thereof, a drag bucket, and a flexible connection attached to said bucket and wound upon the smaller portion of said drum.

7. In a cableway, in combination, spaced supports a main cable suspended thereby, a carriage supported by and adapted to move along the main cable, a differential drum mounted on said carriage and provided with a portion formed with a spiral groove of variable diameter, a traversing line wound in the spiral groove of said drum and normally leaving the same at the largest diameter thereof, a drag bucket, and means for suspending said drag bucket from said carriage comprising a flexible connection wound upon the smaller portion of said drum.

THOMAS SPENCER MILLER.

Witnesses:
 CHAS. C. PIERCE,
 CHAS. G. MUNIER.